(12) United States Patent
Okuno et al.

(10) Patent No.: US 12,413,851 B2
(45) Date of Patent: Sep. 9, 2025

(54) INSPECTION DEVICE AND INSPECTION METHOD

(71) Applicant: Honda Motor Co., Ltd., Tokyo (JP)

(72) Inventors: Yasuhiro Okuno, Tokyo (JP); Sukeyuki Shinotsuka, Tokyo (JP); Shoji Matsuda, Tokyo (JP); Shunsuke Torigai, Tokyo (JP); Yosuke Tanaka, Tokyo (JP); Daiki Kurei, Tokyo (JP); Koki Isobe, Tokyo (JP); Kotaro Nakamoto, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 1 day.

(21) Appl. No.: 18/358,950

(22) Filed: Jul. 26, 2023

(65) Prior Publication Data

US 2024/0098363 A1     Mar. 21, 2024

(30) Foreign Application Priority Data

Sep. 20, 2022  (CN) .......................... 202211142349.X

(51) Int. Cl.
*H04N 23/60*   (2023.01)
*H04N 23/63*   (2023.01)

(52) U.S. Cl.
CPC ........... *H04N 23/64* (2023.01); *H04N 23/633* (2023.01)

(58) Field of Classification Search
CPC .......................... H04N 23/64; H04N 23/633
See application file for complete search history.

(56) References Cited

U.S. PATENT DOCUMENTS

| | | | | |
|---|---|---|---|---|
| 11,290,638 | B1 * | 3/2022 | Duffy | H04N 23/634 |
| 2017/0018067 | A1 * | 1/2017 | Rourke | G06T 7/0006 |
| 2019/0251747 | A1 * | 8/2019 | Yin | G06T 7/74 |
| 2019/0301845 | A1 * | 10/2019 | Nickel | G01B 5/066 |

FOREIGN PATENT DOCUMENTS

JP          2000244583          9/2000

* cited by examiner

*Primary Examiner* — Sath V Perungavoor
*Assistant Examiner* — Tyler B Edwards
(74) *Attorney, Agent, or Firm* — JCIPRNET

(57) ABSTRACT

An inspection device and an inspection method are provided. The inspection device includes: a main body portion, configured to be held by an inspector; a camera portion, disposed on the main body portion and configured to capture an inspected portion of a vehicle; and a guiding portion, configured to guide a camera direction of the camera portion to the inspector, so that an image obtained through the camera portion becomes a prescribed image suitable for inspection.

4 Claims, 7 Drawing Sheets

INSPECTION DEVICE AND INSPECTION METHOD

CROSS-REFERENCE TO RELATED APPLICATION

This application claims the priority benefit of China application serial no. 202211142349.X, filed on Sep. 20, 2022. The entirety of the above-mentioned patent application is hereby incorporated by reference herein and made a part of this specification.

BACKGROUND

Technical Field

The disclosure relates to an inspection device and an inspection method.

Description of Related Art

When the general inspection device inspects a vehicle, it is often difficult to conduct an accurate inspection by a visual manner. In recent years, research and development to obtain and support user data related to inspection is underway.

Therefore, in the technologies for training or assistance related to human movements, how to perform a precise inspection on an inspection object is a topic.

In order to solve the above issue, the disclosure aims to achieve precise inspection, thereby reducing the inspection time through guiding the direction of a camera.

SUMMARY

An embodiment of the disclosure provides an inspection device, which includes: a main body portion, configured to be held by an inspector; a camera portion, disposed on the main body portion and configured to capture an inspected portion of a vehicle; and a guiding portion, configured to guide a camera direction of the camera portion to the inspector, so that an image obtained through the camera portion becomes a prescribed image suitable for inspection.

Another embodiment of the disclosure provides an inspection method, which includes: capturing an inspected portion of a vehicle; guiding an image obtained through capturing, so that the image becomes a prescribed image suitable for inspection; and adjusting an inspection position, and inspecting the inspected portion when the inspection position is suitable for inspecting the inspected portion.

DESCRIPTION OF THE EMBODIMENTS

Figure 1:
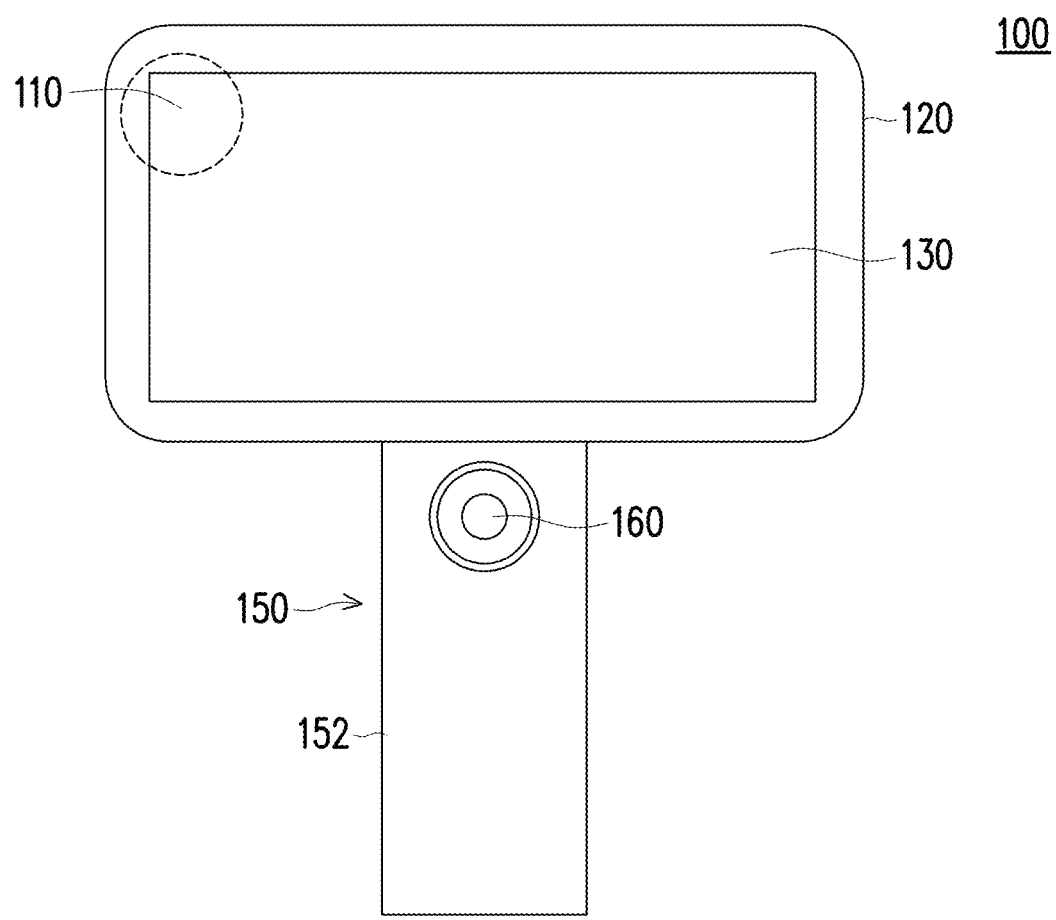
FIG. 1 is a schematic structural diagram of an inspection device according to an embodiment of the disclosure.

Based on the above description, an embodiment of the disclosure provides an inspection device, which includes: a main body portion, configured to be held by an inspector; a camera portion, disposed on the main body portion and configured to capture an inspected portion of a vehicle; and a guiding portion, configured to guide a camera direction of the camera portion to the inspector, so that an image obtained through the camera portion becomes a prescribed image suitable for inspection.

According to an embodiment of the disclosure, the inspection device further includes a display portion configured to display an image captured by the camera portion. The guiding portion displays a guide image in the image.

According to an embodiment of the disclosure, the inspection device further includes a position obtaining portion configured to obtain a spatial position of the main body portion.

Another embodiment of the disclosure provides an inspection method, which includes: capturing an inspected portion of a vehicle; guiding an image obtained through capturing, so that the image becomes a prescribed image suitable for inspection; and adjusting an inspection position, and inspecting the inspected portion when the inspection position is suitable for inspecting the inspected portion.

Reference will now be made in detail to the exemplary embodiments of the disclosure, examples of which are illustrated in the drawings. Wherever possible, the same reference numerals are used in the drawings and the description to refer to the same or similar parts.

FIG. 1 is a schematic structural diagram of an inspection device according to an embodiment of the disclosure. As shown in FIG. 1, according to an embodiment of the disclosure, an inspection device 100 includes a main body portion 150 that can be held by an inspector. The main body portion 150 may include an inspection portion 120 having a display portion 130. The main body portion 150 may be designed with a holding portion 152 for the inspector to hold. In addition, an outer frame portion of the inspection portion 120 may be used as the holding portion held by the inspector. In this way, the inspector may conveniently inspect a vehicle, such as one or more inspected portions in an engine room.

The inspection device 100 may include a camera portion 110 and the display portion 130. The camera portion 110 is, for example, disposed on the main body portion 150, in other words, at the inspection portion 120. The camera portion 110 can capture one or more inspected portions of the vehicle. The display portion 130 may display various operation interfaces, inspection interfaces, etc. for the inspector to operate, and the detailed operation will be described in detail below. The display portion 130 may, for example, be a liquid crystal display.

In addition, according to an embodiment of the disclosure, the inspection portion 120 may be implemented using a smart terminal, and the smart terminal may, for example, be an apparatus with a camera function such as a smart phone or a tablet. In the description of the following embodiment, the smart phone will be used as an example of the inspection portion 120, and the smart phone will be used for description if there is no confusion. When the smart phone is used as the inspection portion 120, the camera and the screen of the smart phone itself may be respectively used as the camera portion 110 and the display portion 130.

Also, an inspection start key 160 may be disposed on the holding portion 152 of the inspection device 100. In addition, an input interface of the inspection start key 160 may also be disposed on the touch screen of the smart phone, and the inspector may press the inspection start key 160 for the inspection device 100 to start inspecting each inspected portion of the vehicle. In addition, between the inspection start key 160 and the inspection portion 120, the start and the end of the inspection device 100 may be controlled through a wired or wireless manner such as WiFi and Bluetooth.

Figure 2:
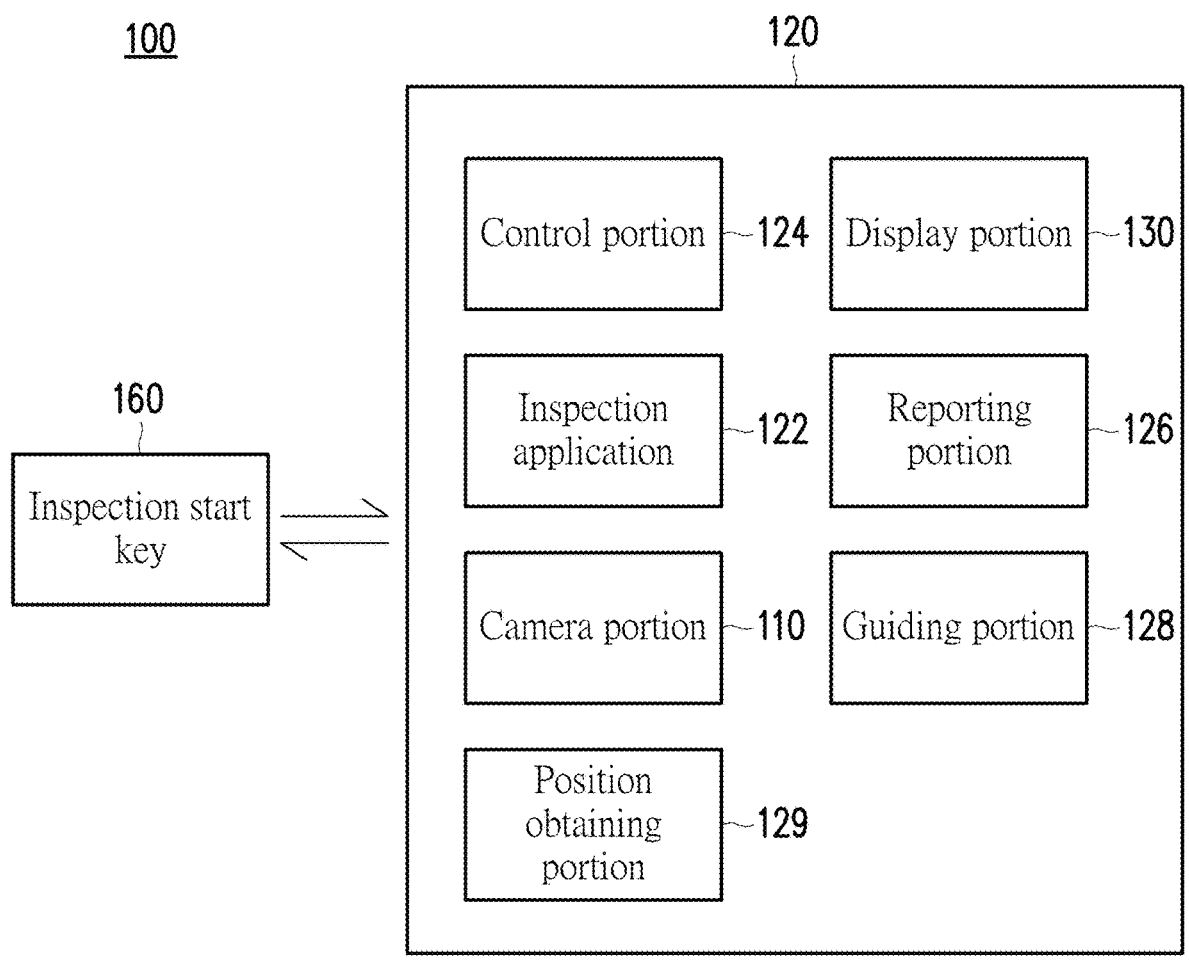
FIG. 2 is a schematic circuit block diagram of an inspection device according to an embodiment of the disclosure.

FIG. 2 is a schematic circuit block diagram of an inspection device according to an embodiment of the disclosure. As shown in FIG. 2, the inspection device 100 may further include a reporting portion 126 and a guiding portion 128. The reporting portion 126 may report inspection information of the inspected portion judged based on an image obtained by the camera portion 110 to the inspector. The guiding portion 128 may guide the camera of the camera portion 110 to the inspector, so that the image obtained by the camera portion 110 becomes a prescribed image suitable for inspection. The reporting portion 126 and the guiding portion 128 may, for example, use sound or light to report to or guide the inspector.

The inspection portion (the smart phone) 120 of the inspection device 100 may further include a control portion 124 and an inspection application 122. The control portion 124 may control the above parts of the inspection portion (the smart phone) 120. The inspection application 122 may be used to execute an inspection procedure.

The inspection device 100 may further include a position obtaining portion 129 configured to obtain the spatial position of the main body portion. The position obtaining portion 129 may, for example, be an image sensor, a position sensor, an inertial sensor, a gyroscope, an accelerometer, a geomagnetic field, a global positioning system (GPS), etc., so as to estimate the position and the orientation of the inspection device 100.

Through the inspection device 100 of the embodiment of the disclosure, the inspected portion (an inspection object) is captured by the camera portion 110. Once the inspected portion is detected in the captured image, the inspection device 100 may estimate the viewpoint position of the camera portion 110. After that, the control portion 124 of the inspection device 100 may calculate the deviation from the inspection viewpoint position determined from the inspection object, and guide the inspector by correcting the deviation. For example, the correction manner is described in FIG. 4A later.

In addition, when the inspection device 100 judges that the inspection viewpoint has reached a specified position (such as when a guide frame and a reference frame described later overlap), the inspection device 100 starts to inspect the inspected portion.

Figure 3:
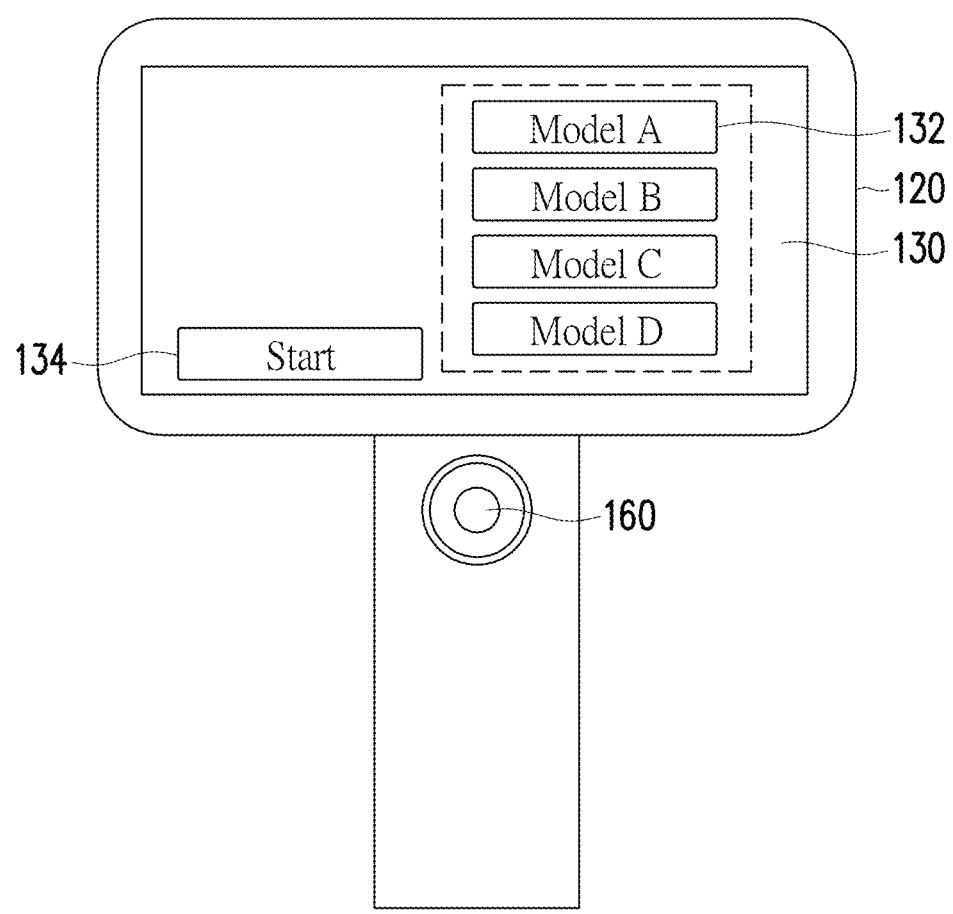
FIG. 3 is a schematic diagram of an operation screen of an inspection device according to an embodiment of the disclosure.

FIG. 3 is a schematic diagram of an operation screen of an inspection device according to an embodiment of the disclosure. Herein, the schematic diagram of the operation flow of the inspection device is described according to FIG. 3. As shown in FIG. 3, after starting the inspection application, a model selection button 130 and a start key 134 are displayed on the display portion 130 of the inspection device. In the example, the model selection button 130 exemplifies four types of models A to D, which may respectively represent 4 different types of vehicles. Of course, the available models are not particularly limited, and the display interface may be modified according to actual requirements. In addition, instead of the model selection button 130, the camera portion 110 may read a barcode pattern disposed on the inspection object, so as to specify the model of the inspection object. Also, the barcode pattern in the example is a QR code as an example, but any usable barcode may be applied in the disclosure, and there is no particular limitation.

Next, how to start the inspection procedure will be described based on FIG. 3. After starting the inspection application, the model selection button 130 and the start key 134 are displayed on the display portion 130 of the inspection device. The inspector, for example, selects one of the models such as the models A to D displayed on the model selection button 130. According to an embodiment, the selection may be made through touching the touch screen of the display portion 130. For example, the model A is selected. The model may represent a type of vehicle model. In addition, for example, the selection may automatically select the model of the inspection object through using the camera portion 110 to read a two-dimensional code (the barcode pattern) of the inspection object. In addition, the selection may also be automatically made in a factory by linking to an apparatus. For example, when the apparatus in the factory detects that the vehicle currently being inspected is the model A, the model A is automatically selected.

Then, through pressing the start key 134 on the display portion 130, the inspector may enter inspection items corresponding to the selected model to perform various inspections on, for example, the model A. After that, the inspector may press the inspection start key 160 of the inspection device 100 to start inspecting the inspected portion of the vehicle.

Figure 4A:
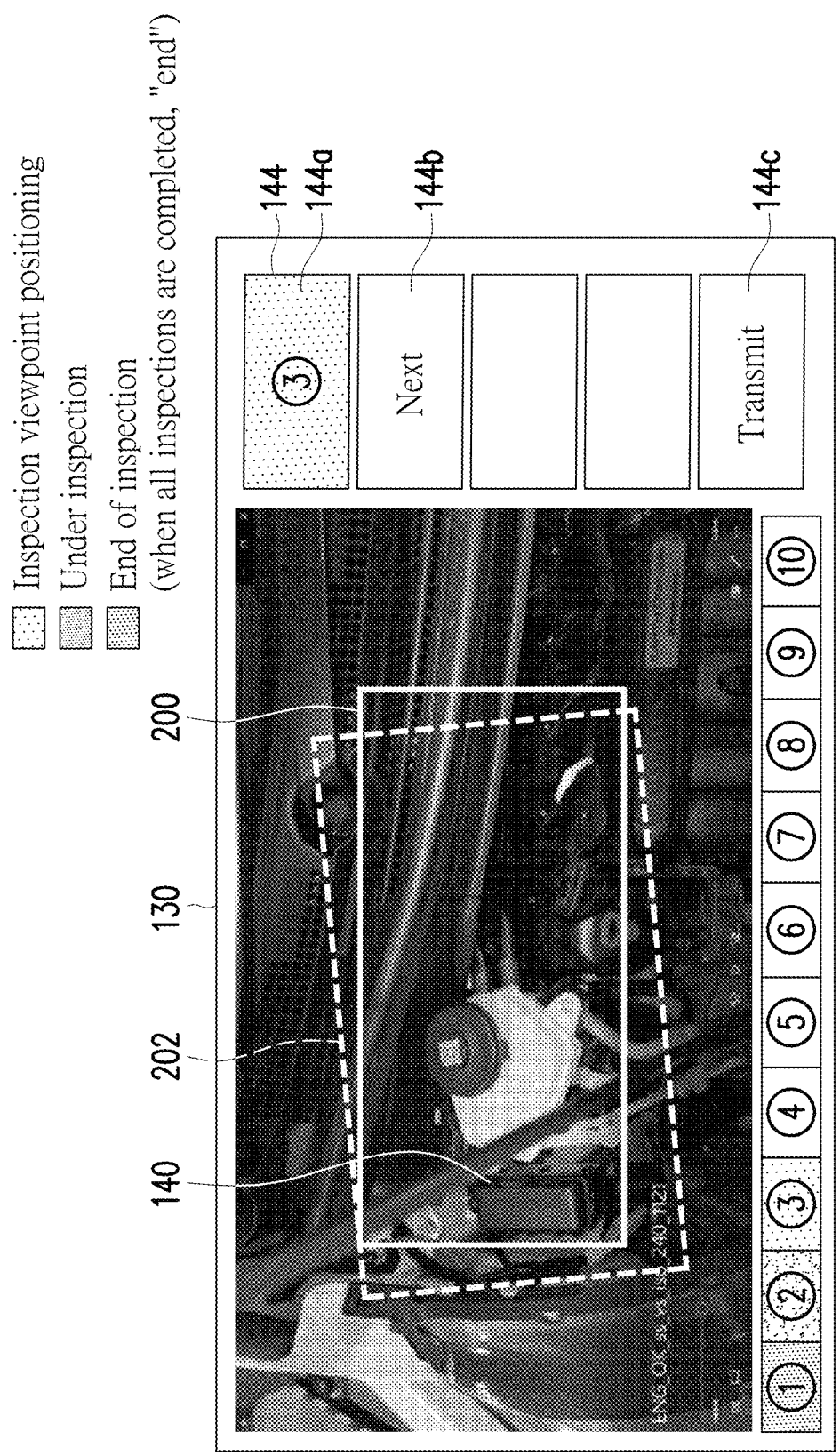
FIG. 4A and FIG. 4B are schematic diagrams of an inspection process of an inspection device of the disclosure.
Figure 4B:
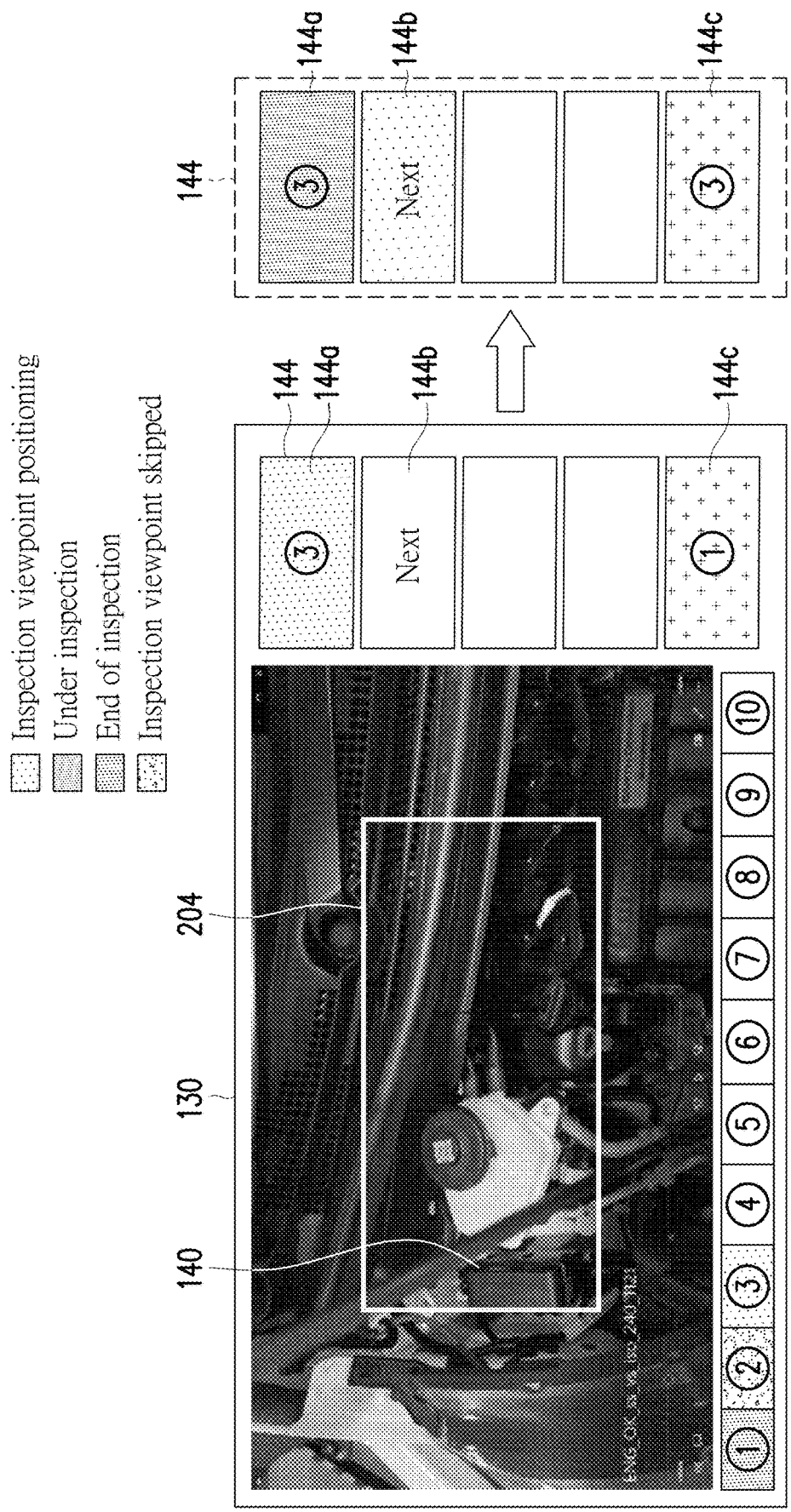

FIG. 4A and FIG. 4B are schematic diagrams of an inspection process of an inspection device of the disclosure. Firstly, as shown in FIG. 4A, according to the operation described above, in the case where the inspector selects the model A, and presses the start key 134 and the inspection start key on the main body portion 150, the display portion 130 enters an inspection screen. The inspection screen includes an image area 140 of the inspection object, such as the engine room of the vehicle. Also, as shown in FIG. 4A, the right side of the inspection screen includes an inspection status area 144. The lower side of the inspection screen includes an inspection viewpoint area 142, which may present multiple inspected portions ① to ⑩.

A reference frame 200 and a guide frame 202 as a position guide are displayed in the image area 140 of the inspection object. The reference frame 200 basically does not move with respect to the display portion 130 and represents a central portion captured by the camera portion 110. Also, the guide frame 202 represents a frame as the inspection viewpoint from which the image suitable for inspection (the prescribed image) may be obtained and is displayed on the display portion 130. The guide frame 202 moves along with the rotation and the movement of the inspection device 100. In this way, the inspector may move the inspection device 100 to align the guide frame 202 with the reference frame 200, so as to inspect the inspected portion after positioning the inspection device 100.

Regarding the inspection viewpoint area 142, 10 inspected portions are displayed in the example, and the inspection viewpoint area 142 presents the inspected portions ① to ⑩. The inspection viewpoint area 142 may be used as a presentation manner of the inspection progress. For example, each of the inspected portions ① to ⑩ may display different colors, so that the inspector may recognize whether each of the inspected portions ① to ⑩ has been inspected. For example, yellow represents that the inspection device 100 is being positioned, orange represents that the inspection is in progress, green represents that the inspection is completed, gray represents that the inspection viewpoint is skipped, etc. In this way, in FIG. 4A, the inspected portion ① displays green, which represents that the inspected portion ① has been inspected. The inspected portion ② displays gray, which represents that the inspected portion ② is skipped and not inspected. The inspected portion ③ is yellow, which represents that the inspection device 100 is being positioned for the inspected portion a. After that, after the guide frame 202 overlaps with the reference frame 200, the image suitable for inspection (the prescribed image) is obtained. The inspected portion ③ displays orange, which represents that the inspected portion ③ is being inspected (under inspection).

In the case where the inspection of the inspected portion ③ is completed, the display of the inspected portion ③ changes to green. Afterwards, in the case where the inspection of the next inspected portion is performed, a new guide frame from which the image suitable for inspection (the prescribed image) of the next inspected portion (for example, the inspected portion ④) may be obtained is displayed on the display portion 130. In addition, in the case where there is no position in the image area 140 from which the image suitable for the inspection (the prescribed image) of the inspected portion ④ may be obtained, for example, an arrow is displayed to change the image area, so as to prompt the inspector to change the camera position and the camera direction.

In this way, when all the inspected portions ① to ⑩ in the inspection viewpoint area 142 display green (or a part displays gray, that is, a part of the inspected portions is skipped), it represents that all the inspected portions ① to ⑩ have been inspected. In this way, the inspector may clearly know the current inspection progress from the inspection viewpoint area 142. In addition, the various color indications mentioned above are only examples, and the colors used in various statuses are not particularly limited. In addition, as long as the various statuses of the inspected portions may be distinguished, an indication manner other than colors may also be used, and the disclosure does not particularly limit the indication manner.

The inspection screen displayed on the display portion 130 of the inspection device 100 may include the inspection status area 144. The example of FIG. 4A is an inspected portion status area 144a, a progress status area 114b, a data transmission status area 144c, etc.

In the case where the positioning of the guide frame of the inspected portion ③ is currently being performed, the inspected portion status area 144a displays ③ and yellow, which represents that the guide frame 202 of the inspection viewpoint of the inspected portion ③ is being positioned. As mentioned above, the inspected portion status area 144a also uses various colors to represent the various statuses of the inspected portion a. For example, yellow represents that the guide frame 202 is being positioned for the inspected portion ED, orange represents that the inspection in progress (under inspection), and green represents that the inspected portion has been inspected.

The progress status area 114b may present "next". When the inspected portion has not been inspected, the "next" in the progress status area 114b may present a specific color (for example, white) or other indication manners to inform the inspector that the next inspected portion will not be processed currently. In addition, when the inspected portion has been inspected, the "next" in the progress status area 114b may change the color or the indication manner, or become a status available for the inspector to press to inform the inspector that the processing of the next inspected portion is currently being prepared. Accordingly, the inspector may clearly grasp the inspection progress of the inspected portion. In addition, when preparing for the processing of the next inspected portion, the new guide frame of the next inspected portion may be displayed.

The data transmission status area 144c is used to display a data transmission status of an inspection result of the inspected portion. As shown in FIG. 4B, still taking the inspected portion ③ as an example, after the guide frame 202 is aligned with the reference frame 200 or the guide frame 202 becomes the reference frame 200, the guide frame 202 may change color to become an inspection frame 204 to automatically obtain the image suitable for inspection (the prescribed image). At this time, it represents that the inspection device 100 has been aligned with the inspected portion ③, and starts to enter an inspection status. It should be noted that the display image in the aligned status may be a momentary status and may not be identified.

Since the inspected portion ③ is in the inspection status at this time, the inspected portion status area 144a displays ③ and orange, and the "next" in the progress status area 114b presents white or other indication manners. In addition, when inspecting the inspected portion ③, the inspection device 100 may transmit the inspection result of the previous inspected portion, for example, to other apparatuses, etc. At this time, the data transmission status area 144c may, for example, display ①, which represents that the inspection result of the inspected portion ① is being transmitted. Also, in order for the inspector to recognize that data is being transmitted, a specific color or manner may be used to prompt the inspector.

Also, after the inspection of the inspected portion ③ is completed, the inspected portion status area 144a may display green, so that the inspector may immediately know that the inspected portion ③ has been inspected. At the same time, the "next" in the progress status area 114b may present another color or indication manner other than white to let the inspector know that the inspection device 100 is about to inspect the next inspected portion. Also, the data transmission status area 144c may, for example, display ③, which represents that the data of the inspection result of the inspected portion ③ is being transmitted. Referring to FIG. 4A, since the inspected portion ② is skipped in the exemplary example, after the data of the inspection result of the inspected portion ① is transmitted, the data transmission status area 144c continues to display the transmission of the data of the inspection result of the inspected portion ③.

Figure 4C:
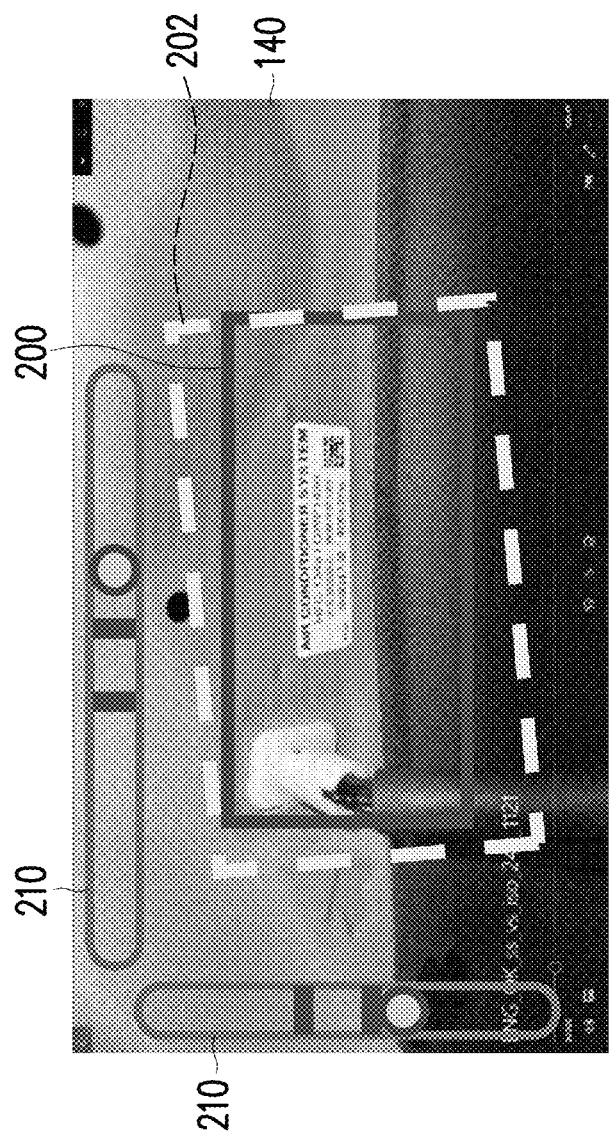
FIG. 4C is a variation example of a guide frame alignment manner.

FIG. 4C is a variation example of a guide frame alignment manner. The image area 140 of the inspection screen may further include a leveler 210. When the inspection position cannot be positioned using only the guide frame 202, according to the embodiment of the disclosure, the leveler 210 may be further added on the inspection screen of the display portion 130 of the inspection device 100 to position the inspection position.

Figure 5:
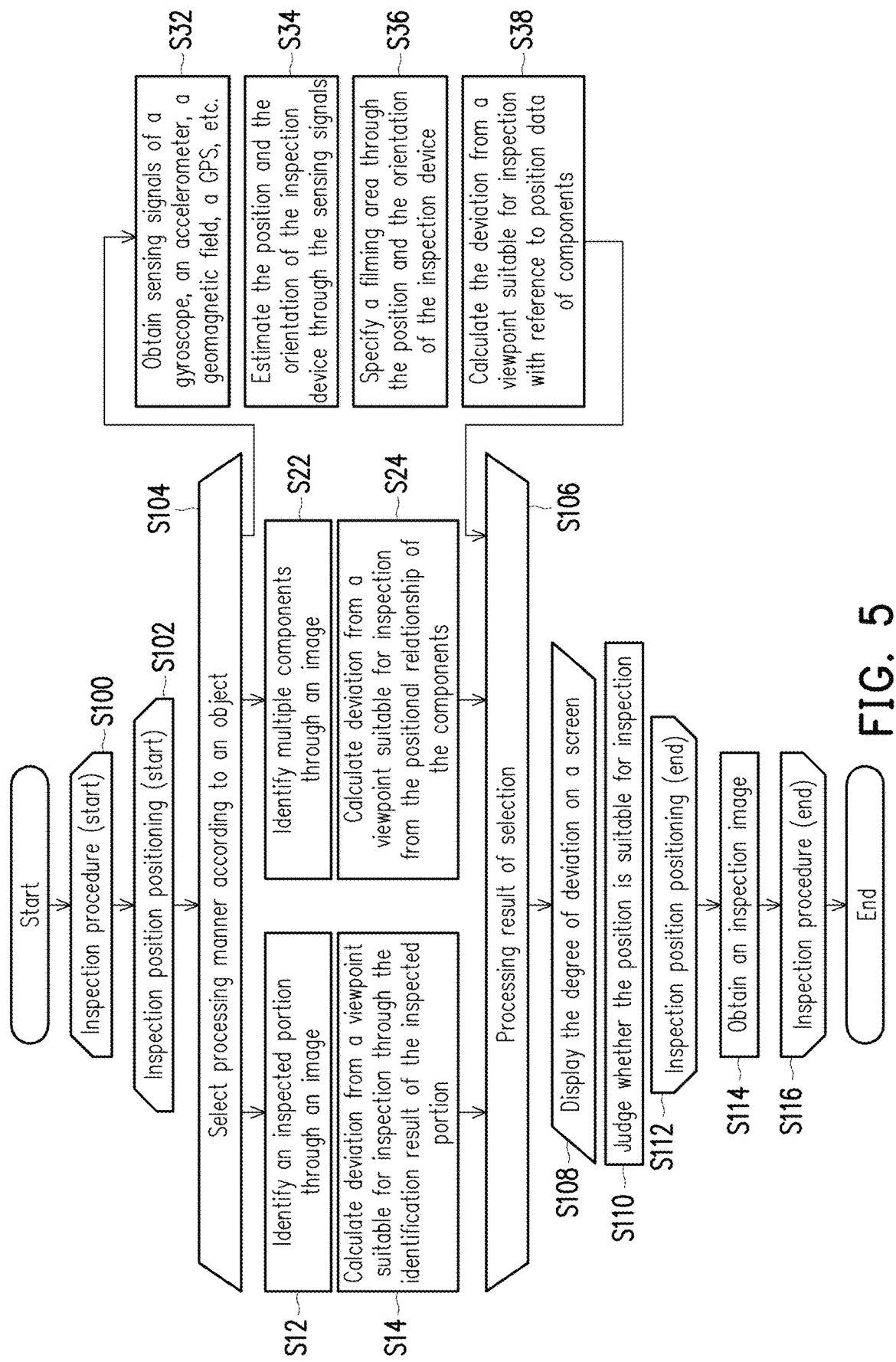
FIG. 5 is a schematic diagram of an inspection process according to an embodiment of the disclosure.

FIG. 5 is a schematic diagram of an inspection process according to an embodiment of the disclosure, especially a schematic diagram of a guide frame positioning process related to the inspection viewpoint (the inspected portion). As shown in FIG. 5, there are three manners related to the positioning of the inspection viewpoint for selection, such as Steps S12 to S14, Steps S22 to S24, and Steps S32 to S38. Further description will be given below with reference to FIG. 5.

Firstly, in Step S100, an inspection procedure is entered and ends in Step S116. The inspection procedure is continuously performed in a cyclic manner until all inspected portions are inspected. Also, if an exit condition is set, the inspection procedure may also be exited if the condition is met.

Next, Step S102 is entered, and inspection position positioning is executed (start). In the entire inspection procedure S100 to S116, the inspection position positioning is continuously performed until the inspection position positioning of Step S112 (end). That is, the camera portion of the inspection device 100 is used to capture each inspected portion, while rotating or moving the main body portion 150 of the inspection device 100, so that the guide frame 202 is aligned and overlaps with the reference frame 200 on the display portion 130. The inspection position positioning of Step S102 (start) to the inspection position positioning of Step S102 (end) is continuously performed in a cyclic manner. As mentioned above, the inspection position positioning continues until the guide frame 202 on the display portion 130 overlaps with the reference frame before ending.

Next, after the inspection position positioning is executed in Step S112, Step S114 is entered, at this time, the camera portion of the inspection device 100 obtains an image of the inspected portion. In other words, after the inspection position positioning in Step S112 is completed (as shown by the inspection frame 204 of FIG. 4B), the inspection device 100 automatically obtains the image of the inspected portion. Next, the obtained image is inspected in Step S116. Return to Step S100, the inspection procedure of the next inspected portion starts. At this time, the display portion 130 displays the guide frame suitable for the inspection viewpoint of the next inspected portion. Also, in Step S104, one of Steps S12 to S14, Steps S22 to S24, and Steps S32 to S38 may be selected to perform the inspection position positioning. The following will explain one by one.

Firstly, the inspection position positioning manner of Steps S12 to S14 will be described. In Step S12, the inspected portion (the inspection object) is identified through an image. For example, as described above, the inspection device 100 of FIG. 1 captures the engine room of a certain type of vehicle (model), and then identifies the inspected portion.

Next, in Step S14, the deviation from a viewpoint suitable for inspection is calculated through the identification result of the inspected portion (the inspection object). For example, the viewpoint may be estimated through identifying the inspected portion (the inspection object) and using the position in the image. There are several cases regarding specifying the range of each inspection viewpoint. For example, there are viewpoints that need to be precisely positioned otherwise cannot be inspected. Also, there are viewpoints that may be inspected within a specific range. Therefore, the inspector may adjust an appropriate inspection viewpoint according to requirements.

Next, in Step S108, the degree of deviation is displayed on the display portion. Here, as shown in FIG. 4A, the guide frame 202 and the reference frame 200 are displayed on the display portion 130 of the inspection device 100, and there is deviation between the two. In Step S110, it is judged whether the position is suitable for inspection. For example, the inspector may repeatedly adjust the position of the inspection device 100, so that the guide frame 202 and the reference frame 200 overlap to reach a suitable position for inspection. After that, the inspection position positioning is completed in Step S112.

Next, the inspection position positioning manner of Steps S22 to S24 will be described. In Step S22, multiple components of an image are identified. For example, as described above, the inspection device 100 of FIG. 1 captures the engine room of a certain type of vehicle (model), and then identifies multiple components in the inspected portion.

In Step S24, the deviation from a viewpoint suitable for inspection is calculated from the positional relationship of the components. In the manner, an appropriate viewpoint is estimated through the configuration position of the components. Likewise, there are several cases regarding specifying the range of each inspection viewpoint. For example, there are viewpoints that need to be precisely positioned otherwise cannot be inspected. Also, there are viewpoints that may be inspected within a specific range. Therefore, the inspector may adjust an appropriate inspection viewpoint according to requirements.

Next, in Step S108, the degree of deviation is displayed on the display portion. Here, as shown in FIG. 4A, the guide frame 202 and the reference frame 200 are displayed on the display portion 130 of the inspection device 100, and there is deviation between the two. In Step S110, it is judged whether the position is suitable for inspection. For example, the inspector may repeatedly adjust the position of the inspection device 100, so that the guide frame 202 and the reference frame 200 overlap to reach a suitable position for inspection. After that, the inspection position positioning is completed in Step S112.

Next, the inspection position positioning manner of Steps S32 to S38 will be described.

In Step S32, the inspection device 100 obtains sensing signals of an image sensor, a gyroscope, an accelerometer, a geomagnetic field, a GPS, etc. In Step S34, the position and the orientation of the inspection device 100 are estimated through the sensing signals obtained in Step S32.

In Step S36, a filming area is specified through the estimated position and orientation of the inspection device 100 in Step S34. In Step S38, the deviation from a viewpoint suitable for inspection is calculated with reference to position data of components. In this way, the inspection device 100 may estimate the position of the inspection device 100 using an image sensor, a position sensor, an inertial sensor, a gyroscope, an accelerometer, a geomagnetic field, a GPS, etc.

Next, in Step S108, the degree of deviation is displayed on the display portion. Here, as shown in FIG. 4A, the guide frame 202 and the reference frame 200 are displayed on the display portion 130 of the inspection device 100, and there is deviation between the two. In Step S110, it is judged whether the position is suitable for inspection. For example, the inspector may repeatedly adjust the position of the inspection device 100, so that the guide frame 202 and the reference frame 200 overlap to reach a suitable position for inspection. After that, the inspection position positioning is completed in Step S112.

As mentioned above, the inspector may select a suitable processing manner for the object in Step S104. For example, one of Steps S12 to S14, Steps S22 to S24, and Steps S32 to S38 may be selected for the inspection position positioning. Finally, in Step S106, the result of the selected processing manner is output to display the degree of deviation (such as the deviation between the guide frame 202 and the reference frame 200, see FIG. 4A) on the display portion 130 of the inspection device 100.

Also, in the above description, between Steps S104 and S106, three different processing manners are provided for the inspector to select, but it is also possible to provide only two of the three or only one of the three, which may be designed depending on requirements.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. An inspection device, comprising:
   a main body portion, held by an inspector;
   a camera, disposed on the main body portion and configured to capture a first portion of a vehicle to be inspected;
   a display, configured to display an image captured by the camera; and
   a processor, configured to:
      determine whether the captured image satisfies a requirement for inspecting the first portion of the vehicle such that a degree of deviation between the first portion and a predetermined position in the captured image is less than a threshold value; and
      in response to the captured image does not satisfy the requirement for inspecting the first portion,
         display a reference frame on the display that displays the captured image, wherein the reference frame is at a fixed position with respect to the display,
         display a guide frame over the captured image on the display, wherein the guide frame is a frame that surrounds the first portion of the vehicle to be inspected and moves with movement of the inspection device, and
         guide the inspector to change a position and a direction of the camera to capture another image of the first portion of the vehicle until the reference frame overlaps with the guide frame on the display.

2. The inspection device according to claim 1, further comprising:
   a position sensor configured to obtain a spatial position of the main body portion.

3. An inspection method, comprising:
   capturing a first portion of a vehicle to be inspected through a camera;
   displaying an image captured by the camera;
   determining whether the captured image satisfies a requirement for inspecting the first portion of the vehicle such that a degree of deviation between the first portion and a predetermined position in the captured image is less than a threshold value; and
   in response to the captured image does not satisfy the requirement for inspecting the first portion,
      displaying a reference frame on the display that displays the captured image, wherein the reference frame is at a fixed position with respect to the display,
      displaying a guide frame over the captured image on the display, wherein the guide frame is a frame that surrounds the first portion of the vehicle to be inspected and moves with movement of the inspection device, and
      guiding the inspector to change a position and a direction for capturing another image of the first portion of the vehicle of the camera until the reference frame overlaps with the guide frame on the display.

4. The inspection device according to claim 3, wherein the reference frame is at a central portion with respect to the display.

* * * * *